United States Patent Office 3,447,008
Patented May 27, 1969

3,447,008
HIGH STARTING TORQUE INDUCTOR MOTOR
Edward G. Regner, Winsted, and Robert S. Lundin, Thomaston, Conn., assignors to General Time Corporation, Stamford, Conn., a corporation of Delaware
Filed Aug. 25, 1967, Ser. No. 663,397
Int. Cl. H02k 19/04, 21/04
U.S. Cl. 310—164            17 Claims

ABSTRACT OF THE DISCLOSURE

A single phase stator inductor motor having a shaded pole for each pair of main poles. The main poles of one polarity are shifted somewhat from the conventional 180 electrical degree position, and shaded poles are inserted in the resulting wider gaps between adjacent main poles. The degree of shading, pole spacing, and pole dimensions are correlated to give a starting torque approaching the running torque, with positive starting.

---

The invention relates to a single-phase shaded pole inductor motor having a high starting torque. More particularly, the invention relates to a shaded pole motor construction wherein the pole spacing, degree of shading, and pole dimensions are correlated to give positive starting with a high ratio of starting torque to running torque.

Single-phase synchronous inductor motors having permanent magnet rotors are widely used in a variety of applications, such as for timers, servomotors, etc. Such motors are required to start merely upon excitation of the field winding. Achieving reliable starting, particularly under conditions of variable load, presents considerable difficulties. Various means have been employed to provide starting under at least some conditions of static equilibrium when power is applied, such as introducing an asymmetry in the pole spacing or shape. Either the rotor or the stator poles may be made asymmetrical, as typified by the U.S. Patent No. 2,432,573 to Jorgensen. However, it has been discovered that this approach merely moves the region of uncertain starting from the vicinity of zero torque to a region of somewhat higher torque still well within the torque starting capabilities of the motor. This creates in effect a "dead band" of torques wherein starting is unreliable. Motors so constructed may achieve reliable starting near zero torque, while being unreliable at some higher range of torques (the "dead band"), and become reliable again at still higher torques. This is particularly undesirable for motors required to handle a variety of torques. In addition, some proposed constructions using asymmetry produced substantially reduced running torque.

It is likewise known to use some configuration of shaded poles, such as disclosed in the U.S. Patent No. 2,437,142 to Welch. However, the known shaded pole constructions achieve reliable starting by sacrificing running torque, with a resulting loss in power output, or produce a low ratio of starting to running torque. These adverse results occur because such known constructions typically eliminate unshaded poles to provide space for the shaded poles.

Applicant has discovered that an inductor motor may be provided with the reliable starting assured by properly located and phased shaded poles, together with substantially no loss in running torque, if the motor is constructed according to the principles disclosed below.

Accordingly, a primary object of the invention is to provide a self-starting inductor motor having a high running torque and a high ratio of starting torque to running torque.

A further object is to provide a motor of the above character wherein the starting torque is more than half the value of the running torque wherein a novel no-back assembly prevents reverse rotation.

A still further object is to provide a motor of the above character wherein one set of main poles is displaced somewhat from the conventional 180 electrical degree position, and shading poles are positioned in the resulting wider gaps between adjacent main poles.

A further object is to provide a motor of the above character wherein the dimensions and spacings of the unshaded and shaded poles are correlated to give optimum characteristics.

A further object is to provide a motor of the above character wherein the degree of shading is correlated with the locations of the shaded poles, to provide optimum characteristics.

A further object is to provide a motor of the above character which is simple and economical in construction, and which is reliable in operation.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a more complete understanding of the nature and objects of the invention, reference should be had to the following detailed description taken in connection with the accompanying drawings, which are drawn substantially to scale, and in which.

Figure 1:
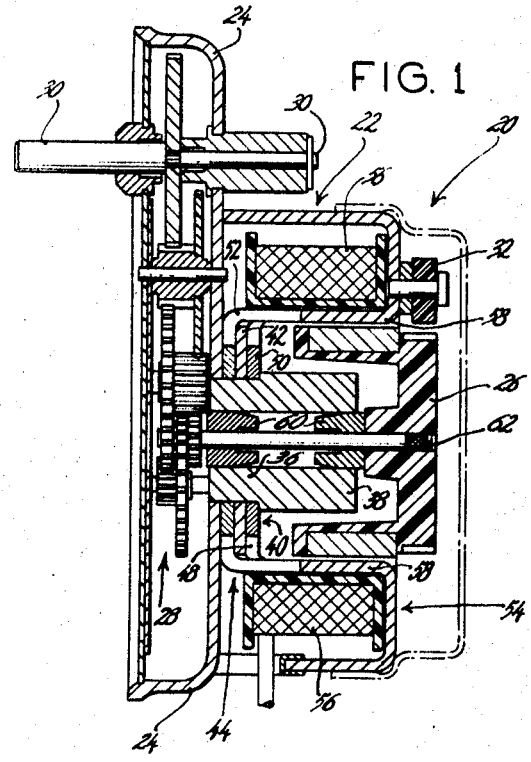
FIGURE 1 is a sectional view of the preferred embodiment of the inductor motor according to the present invention.
Figure 2:
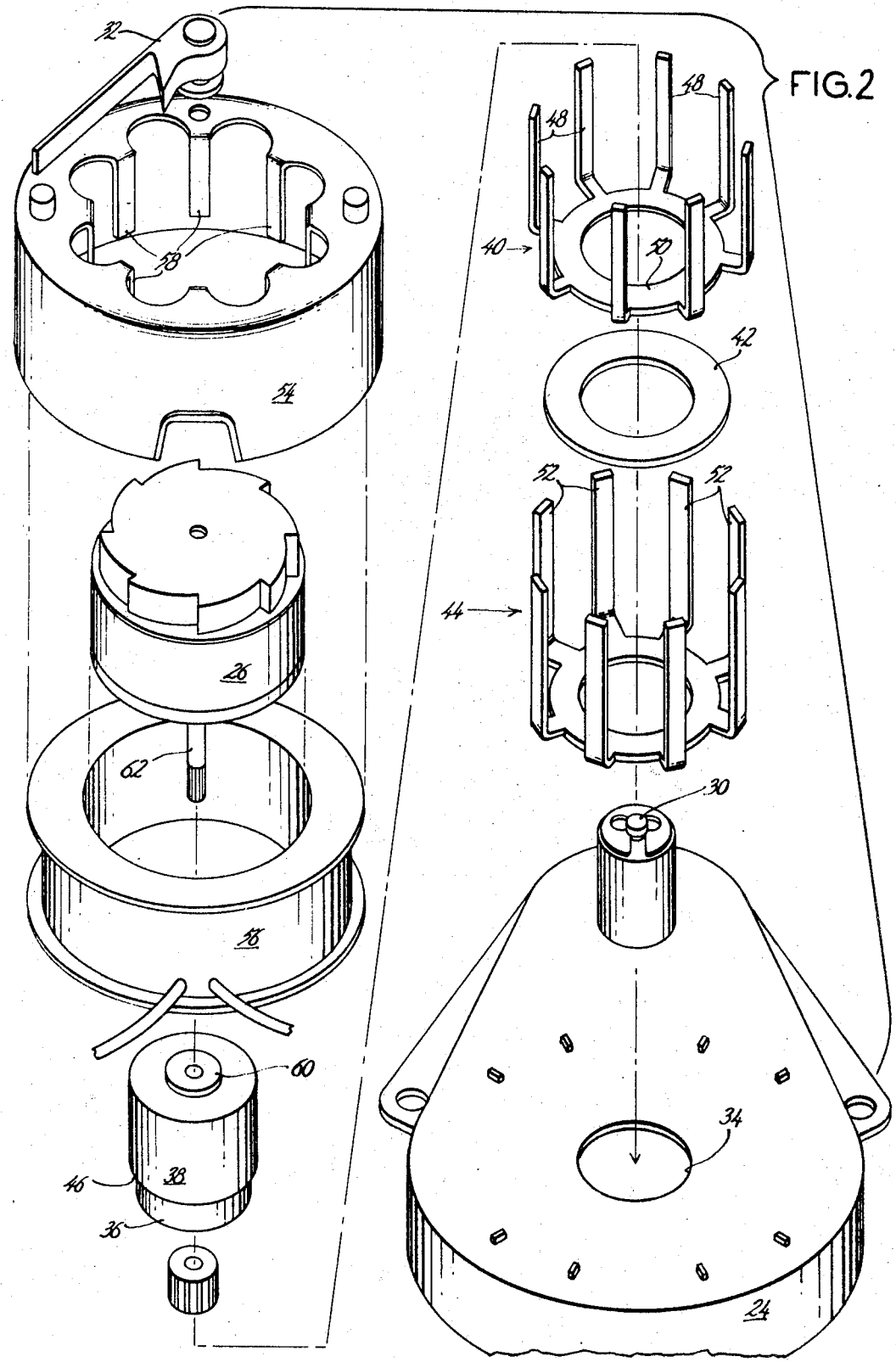
FIGURE 2 is an exploded perspective view of the FIGURE 1 motor.

Referring now generally to FIGURES 1 and 2 of the drawing, which illustrate the preferred embodiment of the invention in the form of a 16-pole motor, motor 20 includes a stator assembly 22 including ferromagnetic gear box housing 24, together with rotor 26 rotatably mounted for cooperation with the stator. A gear train 28 connects rotor 26 to the output shaft 30. A no-back assembly 32 may be provided to prevent reverse rotation of rotor 26 if desired.

Referring more particularly to FIGURE 2, housing 24 serves as a frame on which the remaining stator components are mounted. A circular aperture 34 extends through housing 24 for receiving cylindrical portion 36 of a ferromagnetic core 38. Shaded pole piece 40, shading disc 42, and unshaded pole piece 44 are assembled on portion 36 in the named order, with shaded pole piece 40 abutting a radially extending shoulder 46 on core 38, before the free end of portion 36 is inserted in and secured to the walls of aperture 34, as by welding or staking.

Since motor 20 is illustrated as a 16-pole motor, pole piece 40 includes eight equally spaced, axially extending pole tabs 48. Pole piece 40 may be formed by stamping from sheet stock so as to form the perforated circular portion 50 with eight radially extending pole tabs 48, which are then bent to extend axially.

Unshaded pole piece 44 is similar to pole piece 40, and accordingly need not be described in detail. However, the dimensions of the individual pole tabs 52 preferably vary somewhat from those of pole tabs 48, as will be disclosed below. Unshaded pole tabs 52 and shaded pole tabs 48 are located on cylinders having the same radius, so that when assembled with pole tabs 48 between pole tabs 52, tabs 48 and 52 lie on the same right circular cylinder about the axis of core 38.

Figure 3:
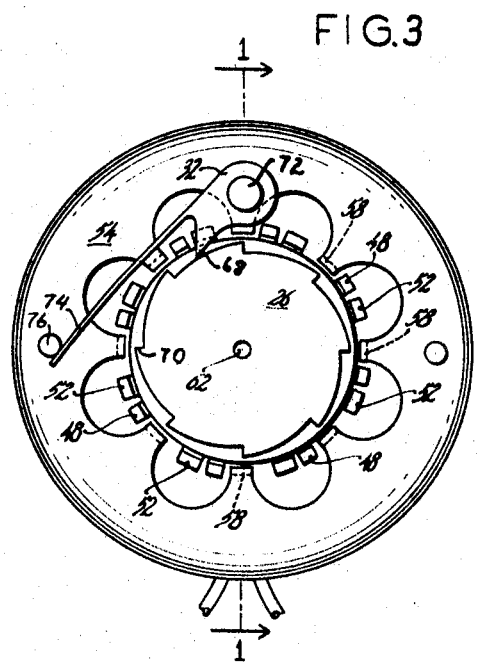
FIGURE 3 is a sectional view taken along line 3—3 in FIGURE 1.

A ferromagnetic annular field cup 54 surrounds and supports single-phase stator coil 56. The left edge of cup 54 as viewed in FIGURE 1 may be secured (as by welding) to housing 24 centered about aperture 34. The opposite edge extends radially inwardly and terminates in eight equally spaced axially aligned pole tabs 58 lying within coil 56. Pole tabs 58 lie on the same right circular cylindrical surface about the axis of core 38 as do poles 48 and 52. As best seen in FIGURE 3, the assembled stator has an unshaded pole 52 and a shaded pole 48 on opposite sides of each pole 58.

When coil 56 is energized by an alternating current, field cup 54 together with housing 24 and unshaded pole piece 44 form a flux path for conducting the resulting alternating magnetic flux to pole tabs 52 and pole tabs 58. This constitutes the main magnetic circuit for the motor. Another flux path exists from field cup 54 through housing 24 and core 38 to shaded pole piece 40. Since this latter flux path passes through copper shading disc 42, poles 48 are supplied with a shaded magnetic flux which lags behind the instantaneous value of the flux in poles 52. Accordingly, a rotating magnetic field is set up within stator 22 when coil 56 is energized.

As best shown in FIGURE 1, core 38 supports a pair of axial bearings 60 for rotatably receiving shaft 62 of rotor 26. Rotor 26, which is formed from a rigid epoxy resin, includes in the illustrated embodiment 16 equally spaced permanent magnetic poles 64, and 66 of alternate polarity equally spaced about its circumference. Poles 64 and 66 may be formed in a ceramic barium-iron oxide annulus 67 cast in rotor 26, and magnetized by a number of known techniques. In the disclosed motor, the larger surfaces of pole pieces 48, 52, and 58 extend parallel to the rotor axis in the vicinity of rotor poles 64 and 66. This feature provides for excellent magnetic coupling between the stator, poles, and rotor and contributes substantially to the high starting and running torques obtained with the motor.

Upon energization of coil 56, the resulting rotating magnetic field produced by stator 22 tends to cause rotor 26 to rotate counter-clockwise in the particular embodiment illustrated. It will be understood by those skilled in the art that clockwise rotation may be provided by reversing the relative position of shaded poles 48 and unshaded poles 52.

According to a particular aspect of the invention, optimum starting and running characteristics are provided by properly correlating the pole dimensions and spacings, and the degree of shading supplied by shading disc 42.

Figure 4:
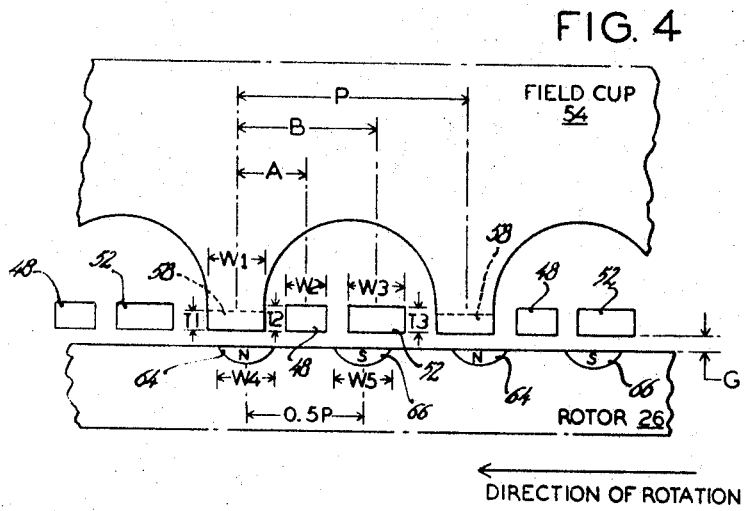
FIGURE 4 is a developed view of the rotor and stator poles.

It has been found that the motor configuration disclosed makes possible a high running torque and a high ratio of starting torque to running torque, if the following considerations are observed. Referring to FIGURE 4, poles 58 are spaced apart by a distance P equal to 360 electrical degrees, which, in the illustrated 16-pole motor, equals 45 mechanical degrees. Unshaded main poles 52 are circumferentially displaced from alignment with poles 58 by a distance B equal to (0.6±0.0875) P, in the direction opposite from the direction of rotation of rotor 26. It is noted that poles 52 are thus not positioned 180 electrical degrees from poles 58, as would be conventional. Shaded poles 48 are circumferentially displaced from alignment with poles 58 by a distance A equal to (0.5±0.04) B, in the direction opposite to the direction of rotation of rotor 26. In the optimum form of motor 20, the circumferential widths W3, W1, W4 and W5 of poles 52, 58, 64 and 66, respectively, are equal to (0.25±0.0125) P, while the circumferential widths W2 of poles 48 equal (0.175±0.0088) P.

The radial clearance B between the rotor poles and the stator should be a minimum consistent with insuring that the rotor does not rub against the stator poles. A clearance of 0.020 inch with a rotor radius of 0.420 inch is exemplary. The radial thickness T2 and T3 of poles 48 and 52, respectively, should be at least 2 G, while the radial thickness T1 of poles 58 should be at least 1.5 G.

With the rotor and stator constructed as thus described, optimum shading of poles 48 exists when the tangent of the shaded angle substantially equals $$\sqrt{\frac{S_s}{S_u} - 1}$$

wherein $S_u$ equals the area of the unshaded pole pieces 52 which is opposed to rotor 26, and $S_s$ equals the area of the shaded poles 48 which is opposed to rotor 26. The shaded angle is the amount by which the flux in the shaded poles lags the flux in the unshaded poles, expressed in electrical degrees.

The effects of variations of certain of these parameters are illustrated in the following Tables 1 and 2, wherein Table 1 shows certain motor dimensions for eight different test motors, and Table 2 discloses the motor torque characteristics and the strobe effect.

TABLE 1

| Motor | t1 | t2 | t3 | w1 | w2 | w3 | Shading coil thickness | A/P | B/P |
|---|---|---|---|---|---|---|---|---|---|
| 1 | .031 | .031 | .031 | .075 | .075 | .075 | .094 | .216 | .609 |
| 2 | .031 | .031 | .031 | .085 | .085 | .085 | .094 | .244 | .622 |
| 3 | .031 | .040 | .040 | .085 | .085 | .085 | .094 | .244 | .622 |
| 4 | .040 | .040 | .040 | .085 | .085 | .085 | .094 | .244 | .622 |
| 5 | .040 | .040 | .040 | .085 | .085 | .085 | .047 | .244 | .622 |
| 6 | .031 | .040 | .040 | .085 | .040 | .085 | .094 | .25 | .5 |
| 7 | .031 | .040 | .040 | .085 | .060 | .085 | .094 | .3 | .6 |
| 8 | .031 | .040 | .040 | .085 | .060 | .085 | .047 | .3 | .6 |

In Table 1, all dimensions are in inches, and the stator poles were arranged on a cylinder having a radius of 0.440 inch. The rotor had a radius of 0.420 inch, and the rotor clearance G was thus 0.020 inch. Identical stator coils were used in all test motors.

TABLE 2

| Starting torque | | Running torque | | Strobe effect |
|---|---|---|---|---|
| 100 v. | 150 v. | 100 v. | 150 v. | |
| 152 | 160 | 152 | 160 | Severe. |
| 168 | 160 | 152 | 160 | Do. |
| 184 | 200 | 184 | 200 | Do. |
| 176 | 208 | 184 | 216 | Mild. |
| 168 | 200 | 176 | 208 | None. |
| 144 | 224 | 240 | 224 | Do. |
| 216 | 256 | 216 | 256 | Do. |
| 256 | 288 | 264 | 288 | Do. |

The strobe effect referred to in Table 2 is an objectionable variation in rotor angular velocity wherein the rotor jerks from one position to another. In severe cases, the rotor completely stops before abruptly moving to a new position. The torques in Table 2 are in ounce-inches with the output geared down to 1 r.p.m.

In motors 1 through 5, poles 48 were positioned touching the nearest poles 58. In motor 1, the circumferential widths of the poles were .075 inch. This resulted (Table 2) in a relatively low torque and a severe strobe effect. Widening the poles in the circumferential direction (motor 2) increased the torque output, but still resulted in severe strobe effect. In motor 3, the thicknesses of poles 48 and 52 were increased, further increasing the torque, but still resulting in a severe strobe effect. In motor 4, the thicknesses of poles 58 were increased, further increasing the torque and reducing the strobe effect somewhat. Motor 5 had a shading disc of reduced thickness, eliminating the strobe effect but at a sacrifice in torque.

In motors 6 through 8, poles 48 no longer touched poles 58, but were spaced as indicated in the tables. Motors 6 through 8 displayed no storbe effect, and had substantially improved torque characteristics. Motor 7, which increased the width of poles 48, resulted in substantially increased starting torque at 100 volts, and starting and running torques at 150 volts, although running torque at 100 volts fell off somewhat. Motor 8, which reduced the shading disc thickness, substantially improved starting and running torques at both 100 and 150 volts. Motor 8 represents the presently preferred embodiment of the invention, wherein both starting and running torques are at very high values for a motor of this size. Motor 8 will start under virtually any load that it can sustain while running, regardless of the position in which the rotor stops.

The torques given in the tables are for motors rotating in the intended direction, such as counter-clockwise in the illustrated embodiment. Without a no-back, the motor on occasion will start and run in the reverse direction, although its torque output would then be considerably lower. The illustrated no-back 32 prevents such reverse rotation, and includes a resilient pawl 68 engaging ratchet teeth 70 rigidly mounted on rotor 26. Pawl 68 is pivoted on stud 72 (which in turn is mounted on field cup 54), and includes a resilient integral finger 74 bearing against stud 76 to resiliently urge pawl 68 into engagement with ratchet teeth 70. Stud 76 is preferably formed of a thermoplastic resin, such as nylon or Delrin. It has been found that most reliable operation is obtained when pawl 68 and its finger 74 are formed of a material having the following properties. The flexural strength as determined by ASTM D-790 method should be 700 pounds per square inch minimum. The ultimate strength as determined by ASTM D-412-62T method should be 5,500 pounds per square inch minimum. The ultimate elongation as determined by ASTM D-412-62T method should be 45% minimum. The tensile modulus as determined by ASTM D-412-62T method should be at least 1,000 p.s.i. at 100% elongation, and at least 2,000 p.s.i. at 300% elongation. The Shore hardness as measured by ASTM D-676-59T should be within the range of 88-95. The modulus of elasticity as measured by ASTM D-747 should be approximately 10,000 p.s.i. The compressive strength as determined by ASTM D-695 should be approximately 20,000 p.s.i. The tear strength as determined by Federal Specification 601-M-4221 should be at least 450 pounds per linear inch. In addition, there should be no appreciable loss in these properties at 180° F. in air for at least one year. Suitable materials are the polyurethane resins commercially avaliable from Mobay Chemical Co. as Texin 192A or Texin E266.

Since ratchet teeth 70 are integrally formed on rotor 26, and are made of a rigid material, fabrication of rotor 26 is considerably simplified as compared to designs using a separate resilient member on the rotor for engagement with a camming device. Selection of material for pawl 68 as noted above provide for quiet running and positive no-back action, with a long service life.

It may be seen from the above disclosure that the several disclosed features cooperate with one another to provide a single-phase shaded pole inductor motor having high starting and running torques. The principal advantages are attained by shifting the unshaded stator poles of one polarity from the conventional 180 electrical degree position, with shaded poles inserted in the resulting wider gaps between adjacent main poles. Efficient magnetic coupling is provided by extending the stator poles axially. As particular advantageous aspects of the invention, the pole dimensions and spacings are correlated with one another and with the degree of shading to provide a high running torque, together with a ratio of starting torque to running torque which is nearly unity in the preferred embodiment. Gear housing 24 and field cup 54 form a simple and efficient magnetic path between poles 58 and poles 52. Core 38 simultaneously provides a magnetic path between housing 24 and poles 48, and supports rotor bearings 60. The resulting motor is efficient and reliable, and provides exceptional performance for its size. Since motors are not generally available having torques between about 100 and 500 ounce-inches, the present motor fills this gap while having a physical size comparable to existing 100 ounce-inch motors.

It will thus be seen that the objects set forth above, among those made apparent from the preceding description, are efficiently attained and, since certain changes may be made in the above article without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A stator assembly for an inductor motor, comprising:
   (A) a toroidal coil having a central axis;
   (B) a ferromagnetic pole assembly means including:
      (1) a first portion adjacent a first end of said coil;
      (2) a second portion surrounding the outer periphery of said coil;
      (3) a third portion adjacent the opposite end of said coil; and
      (4) a plurality N of first poles extending within said coil from said third portion toward said first portion and parallel to said axis, said poles being equally spaced apart by an angular distance P equal to 360°/N;
   (C) a plurality N of second poles magnetically coupled to said first portion and extending parallel to said axis on said circle, said second pole tabs each being equally spaced from one another and being spaced (0.6±0.0875) P from alignment with said first plurality of first poles in a given direction; and
   (D) a plurality of shaded poles magnetically coupled to said first portion and equally spaced from one another, said shaded poles being located (0.3±0.044) P from alignment with said first poles in said given direction.

2. A stator assembly, comprising:
   (A) a toroidal coil having a central axis; and
   (B) ferromagnetic assembly means including:
      (1) a first portion adjacent a first end of said coil;
      (2) a second portion surrounding the outer periphery of said coil;
      (3) a third portion adjacent the opposite end of said coil; and
      (4) a plurality N of pole tabs integral with said third portion and extending within said coil from said third portion toward said first portion and parallel to said axis, sai dpole tabs supporting said coil and being equally spaced apart an angular distance P equal to 360°/N on a circle within said coil.

3. The stator assembly defined in claim 2, further comprising:
   (C) a like plurality of shaded poles, each said shaded pole being spaced substantially 0.3 P in a given direction from the nearest said first pole; and
   (D) a second like plurality of unshaded poles, each of said unshaded poles being spaced substantially 0.4 P from the nearest said first pole in the direction opposite to said given direction.

4. A motor assembly, comprising:
   (A) a stator coil;
   (B) N first stator poles arranged about a central axis, said first poles being positioned on a right circular cylinder about said axis and being equally spaced from one another by an angular distance P, where N equals a whole number and P equals 360/N mechanical degrees;
   (C) N equally spaced second poles positioned between said first poles on said right circular cylinder, said second poles being angularly displaced in a given direction from alignment with said first poles by a distance B equal to $(0.6\pm0.0875)$ P;

(D) N equally spaced shaded poles positioned on said right circular cylinder, said shaded poles being angularly spaced in said given direction from alignment with said first poles by a distance A such that the quantity $A/B$ is $0.5\pm0.04$; and (E) ferromagnetic means coupling magnetic flux of one instantaneous polarity from said coil to said first poles and of opposite instantaneous polarity to said second and said shaded poles.

5. The motor defined in claim 4, further comprising a rotor including 2 N alternate-polarity permanent magnetic poles equally spaced on the periphery thereof, the dimensions of said rotor being such that an air gap G exists between said magnetic poles and said stator poles.

6. The motor defined in claim 5, wherein the radial thickness of said first plurality of poles is at least 1.5 G.

7. The motor defined in claim 5, wherein the radial thickness of said second poles and said shaded poles is at least 2 G.

8. The motor defined in claim 5, wherein the circumferential widths of said magnetic poles equals $$(0.25\pm0.0125) \text{ P.}$$

9. The motor assembly defined in claim 4, wherein the circumferential width of each of said first and second poles equals $(0.25\pm0.0125)$ P.

10. The motor assembly defined in claim 4, wherein the circumferential width of said shaded poles equals $(0.175\pm0.0088)$ P.

11. The motor assembly defined in claim 4, wherein said coil is in the form of a toroid surrounding said poles, and wherein said ferromagnetic means extends around said coil from said first poles to said second poles and to said shaded poles.

12. The motor assembly defined in claim 5, further comprising means for preventing rotation of said rotor in one direction.

13. A motor assembly, comprising:
(A) a stator coil;
(B) N first stator poles parallel to a central axis, said first poles being positioned on a right circular cylinder about said axis and being equally spaced from one another by an angular distance P, where N equals a whole number and P equals 260/N mechanical degrees;
(C) N equally spaced second poles positioned between said first poles on said right circular cylinder, said second poles being angularly displaced in a given direction from alignment with said first poles by a distance B equal to $(0.6\pm0.0875)$ P;
(D) N equally spaced shaded poles positioned on said right circular cylinder, said shaded poles being angularly displaced in said given direction from alignment with said first poles by a distance A less than B, the degree of shading of said shaded poles being such that the flux in said shaded poles lags the flux in said second poles by an amount such that the tangent of the shaded angle is substantially equal to $$\sqrt{\frac{Su}{Ss}-1}$$

electrical degrees, where $Su$ equals the area of said second poles and $Ss$ equals the area of said shaded poles; and
(E) ferromagnetic means coupling magnetic flux of one instantaneous polarity from said coil to said first poles and of opposite instantaneous polarity to said second and said shaded poles.

14. The motor assembly defined in claim 13, wherein said distance A equals $(0.5\pm0.04)$ B.

15. A motor assembly, comprising:
(A) a rotor having rigid ratchet teeth rigidly mounted thereon concentrically about the axis of rotation of said rotor;
(B) a stator for driving said rotor; and
(C) a no-back resilient pawl assembly mounted on said stator, said assembly including:
(1) a resilient pawl pivotally mounted on said stator; and
(2) biassing means resiliently urging said pawl into engagement with said teeth.

16. The motor assembly defined in claim 15, wherein said biassing means includes a resilient finger integral with said pawl, said finger bearing against a fixed portion of said stator whereby said pawl is urged into enagement with said teeth.

17. The motor assembly defined in claim 16, wherein said pawl and said finger are formed of a material having a flexural strength greater than 700 pounds per square inch and a modulus of elasticity of at least 10,000.

References Cited

UNITED STATES PATENTS

| | | | |
|---|---|---|---|
| 2,248,285 | 7/1941 | Reinhardt | 310—164 |
| 3,059,131 | 10/1962 | Everard et al. | 310—164 |
| 3,274,411 | 9/1966 | Kavanaugh | 310—164 |

MILTON O. HIRSHFIELD, *Primary Examiner.*

L. L. SMITH, *Assistant Examiner.*

U.S. Cl. X.R.

310—172